Feb. 26, 1952 G. G. KEYES ET AL 2,587,483

TELEGRAPHICALLY CONTROLLED TIMING MECHANISM

Filed Sept. 17, 1949 2 SHEETS—SHEET 1

INVENTORS
GEORGE G. KEYES
GORDON SIM
BY Emery Robinson
ATTORNEY

TELEGRAPHICALLY CONTROLLED TIMING MECHANISM

Filed Sept. 17, 1949 2 SHEETS—SHEET 2

INVENTORS
GEORGE G. KEYES
GORDON SIM
BY Emery Robinson
ATTORNEY

Patented Feb. 26, 1952 2,587,483

UNITED STATES PATENT OFFICE 2,587,483

TELEGRAPHICALLY CONTROLLED TIMING MECHANISM

George G. Keyes and Gordon Sim, Chicago, Ill., assignors to Teletype Corporation, Chicago, Ill., a corporation of Delaware Application September 17, 1949, Serial No. 116,358

4 Claims. (Cl. 178—4)

This invention pertains to communication systems and more particularly to telegraph systems wherein a series of telegraph stations are connected in a telegraph transmission path.

This application is a division of copending application Serial No. 44,084, filed August 13, 1948, now Patent No. 2,543,174, dated February 27, 1951.

The primary object of the invention is to provide means for controlling selectively a series of geographically separated telegraph tape transmitters over a duplex telegraph transmission path.

Another object of the invention is to provide an arrangement in which tape controlled transmitting apparatus at outlying telegraph stations is automatically set into operation for transmitting stored messages from the outlying stations to the central switching station under the control of equipment at the central switching station.

Another object of the invention is to provide an answer back arrangement for apprising the calling station of the identity of the station called.

A further object of the invention is to provide an improved telegraph system with enhanced facility for controlling transmission to and from the transmitters of a plurality of outlying stations and a central control or switching station.

During normal transmission over a duplex line from the central station to anyone of a series of subscriber's stations, it is at times desirable to ascertain which of said subscriber's stations wishes to transmit to the central station. The selection of stations is under the control of the central station which periodically transmits over the duplex signal line a group of code signals identified as a transmitter start pattern, the significance of which is to initiate the operation of a remote subscriber transmitter if it is in readiness for message transmission. After the ready station has had its transmitter connected into the line, the receiving printer at the subscriber's station is again automatically connected into the line to continue to receive the aforesaid interrupted message from the central station.

A feature of the invention resides in an arrangement in which each station, or the transmitter thereat, is given an opportunity to transmit the messages stored therein. That is, means is provided at a central or control station for periodically conditioning the timing apparatus at the respective stations selectively so that each station is periodically provided with an opportunity to transmit messages over the system, if ready when called.

Another feature resides in an arrangement for permitting an attendant to insert a tape in the tape controlled transmitter at the respecive stations and condition the circuit so that at the next opportunity provided, the message will automatically be transmitted without any further attention or effort on the part of the attendant.

A complete understanding of the foregoing and other objects and features of the present invention may be had from the following description when taken in conjunction with the accompanying drawings, in which, Fig. 1 is a schematic circuit diagram of the arrangement according to the present invention;

Figure 1:
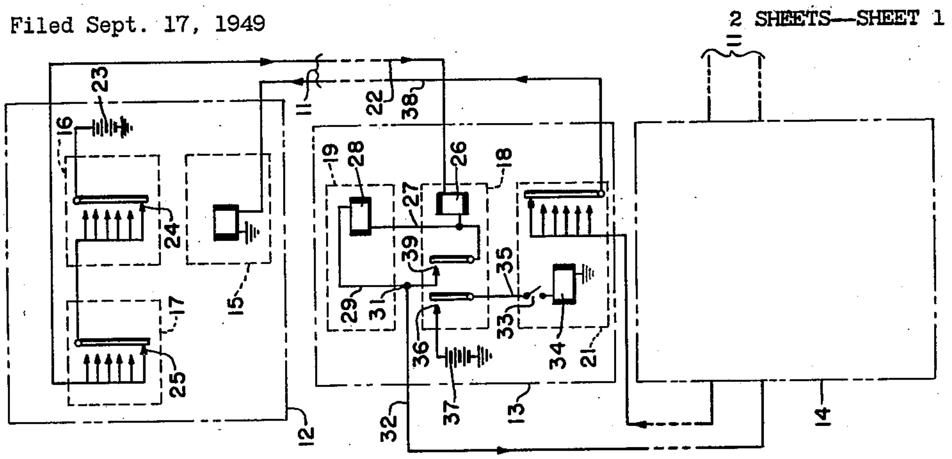

Having reference to Fig. 1, a two-way or duplex line 11 is indicated schematically with the central office 12 located at one end of the line. As may be readily appreciated by those skilled in the art, any suitable number of outlying stations may be connected to the system. The line 11 is provided with a receiving channel and a transmitting channel over which impulses may be simultaneously transmitted as is the usual practice with full duplex channels and well understood in the art. As shown in Fig. 1, the full duplex channel is illustrated by two full metallic one-way telegraph circuits. This has been done so that the invention may be more readily understood without the further complications of the various types of transmission systems commonly employed in telegraph networks for furnishing full duplex telegraph service between various stations and points. It is to be understood, however, that these lines or circuits may include any of the usual types of transmission circuits capable of providing this type of service. Since these transmission circuits operate in their usual and well-understood manner, they have not been shown in detail.

At the central office 12 are located a printer 15 which could be of the type shown in U. S. Patent No. 1,904,164, a tape transmitter 16 of the type disclosed in U. S. Patent No. 2,296,845, and an auxiliary transmitter 17 for transmitting the transmitter start pattern. With a number of stations connected on a duplex line (wherein messages may be transmitted in both directions simultaneously) and messages are sent from the central station selectively to any of the outlying stations on the circuit, it becomes desirable to permit transmission from any of the outlying stations to the central station. This latter transmission is controlled by the central station through the sending periodically therefrom of a series of groups of code signals identified herein as transmitter start patterns, the function of which is to start transmission from selected ones of said outlying stations in any predetermined sequence.

Located at each outlying station is a sequential control unit 18 of the type disclosed in copending application Serial No. 739,747 filed April 7, 1947, by W. J. Zenner, Patent No. 2,568,264, of September 8, 1951, modified by embodying therein the timing mechanism according to the present invention. The sequential control unit 18 is arranged to receive all the impulses transmitted over the line and to respond selectively thereto. It controls the switching circuits in such a manner that the switching circuits are unresponsive during reception of message signals, but upon reception of a succession or sequence of certain preassigned signals they are activated or operatively connected to the selector circuit. Also located at the outlying station are a printer unit 19 and a tape transmitter unit 21. After having perforated the tape, the attendant at the outlying station 13 will insert the tape in the transmitter 21 thereat. At some later time the operator at the central switching station 12 will operate certain keys (not shown) to cause the transmitter 17 to transmit transmitter start pattern code signals over the duplex line 11 to cause the transmitter 21 at the outlying station 13 to be operatively associated with the transmission channel (or duplex line 11) and to start to transmit the signals recorded in the tape. It may be that the operator at the central station had previously operated a special automatic key of the transmitter start circuit which will automatically cause the outlying transmitter to start transmission in rotation with the other similar transmitters at the outlying stations and connected to the transmitting channel of the full duplex line.

It is assumed that transmission is already proceeding from central station 12 over the transmitting channel 22, which circuit extends from grounded battery 23, through the contacts 24 of the message transmitter 16, then through contacts 25 of the auxiliary transmitter 17, then over channel 22, through the winding of selector magnet 26 of the sequential control unit 18, over conductor 27, through the winding of the selector magnet 28 of the receiving printer 19, then over conductor 29 to junction 31, and over transmitting channel 32 through similar elements at successive outlying stations 14 to ground.

If the operator at station 13 desires to transmit a message to the central station 12, he prepares a tape preferably commencing with his station identity and inserts it in the tape transmitter 21, and in so doing a tape controlled contact 33 is closed to prepare a circuit for the start magnet 34 of the tape transmitter 21. This circuit extends from ground, through the winding of start magnet 34, through the contact 33 (now closed), over conductor 35, through contact 36 (now open) in the sequential control unit 18, then to grounded battery 37. The contact 36 is closed in a manner hereinafter described to complete the circuit for the start magnet 34 and to thereby initiate transmission from transmitter 21 over the channel 38 to the central station 12.

As previously mentioned, call signals are transmitted periodically from the central station 12 to "call in" any of the outlying station transmitters 21 in sequential order, and if such transmitter 21 is ready, it is given the opportunity to transmit the message stored in its tape. These call signals are herein referred to as a transmitter start pattern and comprises a group of code signals which effect predetermined operations in the sequential control unit 18. As alluded to hereinbefore, the control unit 18 embodies a timing device which controls the timed operation of contacts 36 and 39. The contact 39 serves to shunt the printer selector magnet 28 so as to suppress printing on the recorder 19 while the "call in" signals of the transmitter start pattern are impressed on the line. The operation (closing) and locking of contact 36 functions to establish the energizing circuit for start magnet 34 of the transmitter 21, after which contact 39 is again opened so that messages may be again transmitted in both directions simultaneously over the duplex line.

Figure 4:
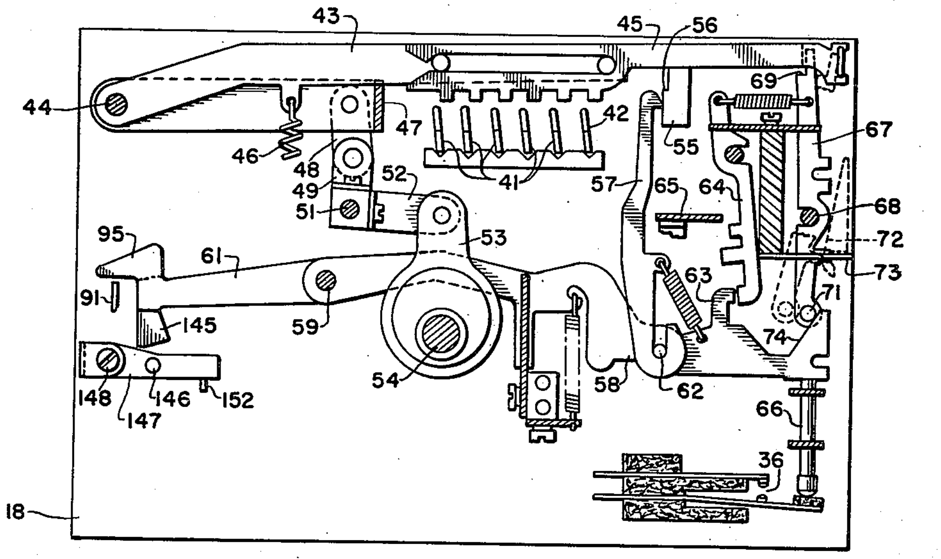
Fig. 4 is a cross-sectional view of the sequential control unit embodying the timing mechanism shown in Figs. 2 and 3.

Having reference to Fig. 4, the sequential control unit 18, which is of the type disclosed in said copending application Serial No. 739,747 is provided with a series of five selector vanes 41 and a corresponding sixth vane 42. The vanes 41 are selectively rocked in accordance with the impulses of the five unit code, and the sixth vane 42 is rocked to its right or left position in response to predetermined code signals. A plurality of selector levers 43 are mounted pivotally on a pivot shaft 44. Levers 43 are each provided with a removably mounted notched or coded element 45. Furthermore, the levers 43 are biased clockwise by individual springs 46 against a bail member 47 also pivotally carried on shaft 44.

Bail 47 is adapted to be operated by a toggle mechanism comprising a link 48 connected between the bail 47 and a bracket 49 fixed to a shaft 51. Also fixed to the shaft 51 is a bracket 52, the outer end of which is connected to an eccentric drive means 53 carried on a shaft 54. During each rotation of shaft 54, the eccentric 53 will rock the shaft 51 to cause the bail 47 to be lowered to permit the code bars 45 to sense the selector vanes 41 to determine which bar 45 will be selected, the selected bar 45 being permitted to be rotated about shaft 44 a slightly greater amount.

Each of the levers 43 is provided with a depending portion 55 having a latching shoulder 56 thereon, so that the shoulder 56 of the selected lever 43 will engage the upper hooked end of a pull bar 57. When the bar 43 is returned to its upper position by the bail 47, the pull bar 57 will lift the bar 58 connected thereto. The bars 58 are individual to the pull bars 57 and are mounted pivotally on a pivot shaft 59. As will presently appear, certain of the bars 58 are provided with leftwardly extending portions 61. When a selected pull bar 57 is elevated, it functions through connection 62 to rotate its associated bar 58 counterclockwise about pivot shaft 59 until the bar 58, through projection 63, becomes latched in its raised position by a latch 64. Bar 58 and element 64 become unlatched by a bail 65, in the manner described in said latter copending application. The actuation and latching of bar 58 in this manner causes, through contact control element 66, the closing of contact 36 to complete the energizing circuit for the start magnet 34 of the transmitter 21 if certain other preliminary or prerequisite conditions hereinafter described are met.

Associated with each bar 58 is a blocking lever 67 mounted on a pivot rod 68. Levers 67 are provided at their upper extremities with a shoulder 69 which in one position of lever 67 functions to block selection of its associated selector bar 45. Levers 67 are provided at their lower extremities with a laterally directed stud 71 adapted to cooperate with the immediately adjacent one of the bars 58. In the operation of the sequential control unit 18, the prerequisite to effecting a sequential selection is to insert a gate instrumentality 72 in the bar 73 to unblock the first lever 67 in the sequence. Thus, upon the selection of the first bar 45 in the sequence, the bar 58 will be lifted, and through its cam surface 74 it will coact with stud 71 to rotate the adjacent lever 67 to unblock the second bar 45 in the sequence for selection. Under the final bar 58 in the series is placed the contact 66 which is operated to control a predetermined function.

As mentioned hereinbefore, the control unit 18 embodies a timing device which controls the timed operation of contacts 39. As viewed in Figs. 2 and 3, the timing unit comprises a shaft 75 which carries rotatably thereon through the instrumentality of a friction clutch (not shown) a sleeve 76. The shaft 75 derives its power through gears (not shown) from the main drive shaft 54, which in turn receives its power from a motor (not shown). Fixed to the sleeve 76 are a plurality of cams 77, 78, 79, 81, 82, and 83. Cam 77 has associated therewith a cam follower arm 84 (Fig. 2) which is an integral part of a bail member 85 mounted pivotally on a pivot shaft 86. A spring 87 normally urges the follower arm 84 against the periphery of cam 77.

The bail member 85 is also provided with a rearwardly extending arm having a laterally directed flange 88 which is provided with a slotted hole 89. A trip lever 91 is pivotally mounted on a pivot shaft 92, and is releasably articulated at its lower end to the flange 88. Lever 91 is provided with a slotted hole 93 and a spring 94 acts to urge the lever 91 both upwardly and in a counterclockwise direction. Cooperating with the upper end of the lever 91 is the rear portion 95 of a special bar 58. In the present embodiment of the invention this special bar 58 responds to the "blank" code signal, a gate 72 having been provided therefor to permit its selection.

Figure 2:
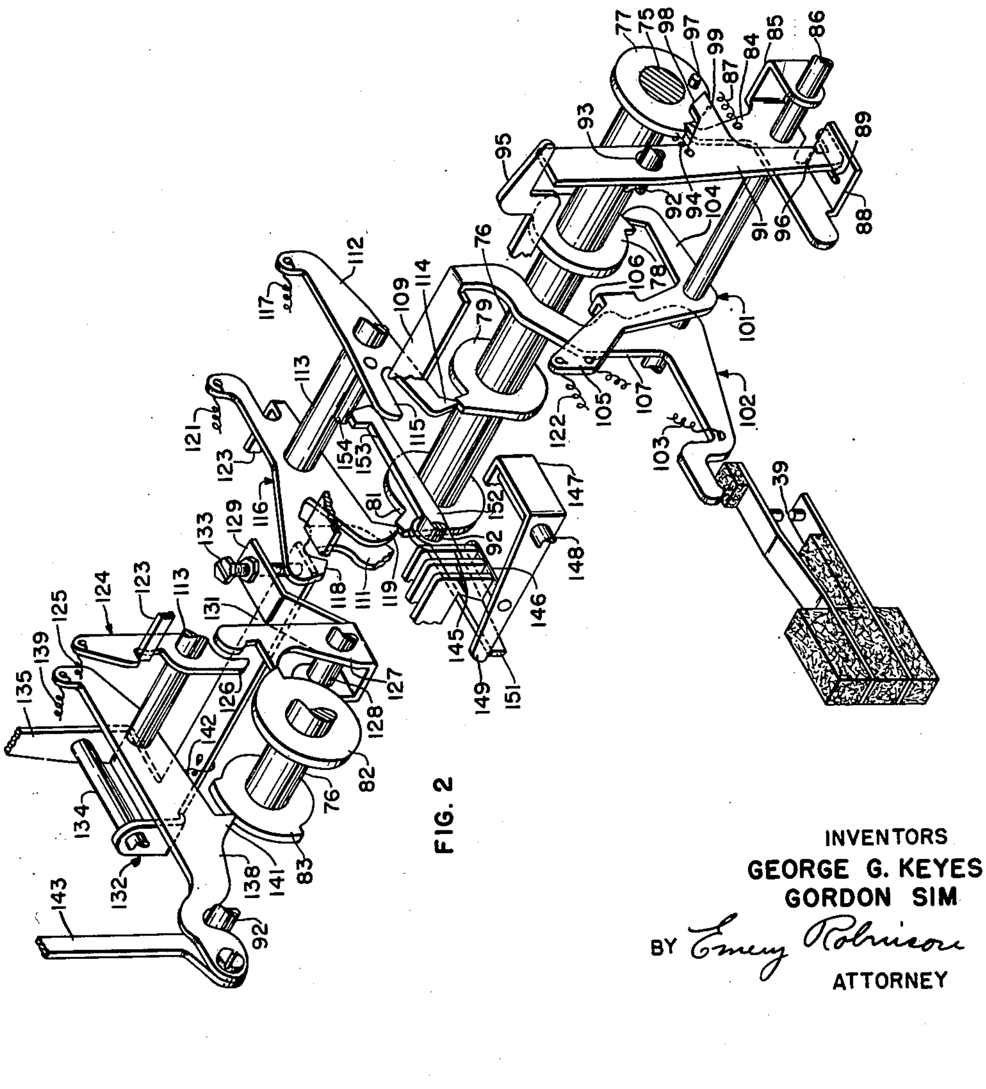
Fig. 2 is an expanded perspective view of the timing mechanism of the present invention.

Upon receipt of a "blank" code signal, the vanes 41 will assume a setting corresponding thereto, which will permit the selection of the "blank" selector bar (corresponding to bar 45). As previously described, this will cause the shoulder 56 to engage hook 57 to effect the raising of bar 58 (identified with the "blank" code), thereby rocking said special bar 58 in a counterclockwise direction (as viewed in Fig. 4) to lower the end 95 and depress the lever 91. As shown in Fig. 2, the notch 96 in lever 91 normally cooperates with the slot 89 to engage the bail 85 to impart a rocking motion thereto. Thus, in response to the receipt of the "blank" code signal, the lever 91 is depressed and the bail 85 is rocked counterclockwise to disengage the arm 84 from the cam 77 to initiate rotation of the cam sleeve 76. To insure a single cycle of rotation of sleeve 76 for each actuation of the bar 91, the cam 77 is provided with a stud 97 which cooperates with a cam surface 98 on a projection 99 on the lever 91. As the sleeve 76 nears the end of its cycle of rotation the stud 97 coacts with cam surface 98 to cam the lever 91 clockwise to disengage the notch 96 from the lateral projection 88 thereby permitting the spring 87 to return the arm 84 into engaging relation with the cam 77 independently of the return of lever 91 to its upward position.

Cam 78 is the operating cam for contact 39, which as previously described, is in the shunt circuit of printer magnet 28 (Fig. 1). Additional contacts may be associated with contact 39 to be operated concurrently therewith to control other operations or functions. Instead of controlling a shunt circuit for printer magnet 28, the contact 39 may directly open the electrical connection thereto, or it may exercise other control over the printer. The contact operating means for contact 39 comprises a bell crank lever portion 101 and a bail portion 102, both mounted pivotally on the pivot shaft 86. Portions 101 and 102 are normally biased in opposite directions by a common spring 103. Portion 101 is provided with a cam follower arm 104 which cooperates with the periphery of the contact control cam 78. The vertical arm 105 of the portion 101 has a laterally directed projection 106 which normally bears against the vertical arm 107 of the portion 102. The horizontal arm of portion 102 cooperates with and operates the contacts 39. The distance X (Fig. 3) between the tip of the cam follower 104 and the drop-off in cam 78 is commensurate with the measured pause in the transmitter start pattern, as will hereinafter appear.

Integral with arm 107 at its upper end is the bail blade 109, which is also integrally connected with the upper end of the other arm 111 of portion 102. Arm 111 is also mounted pivotally on the pivot rod 86. A latch member 112 is pivotally mounted on a pivot rod 113 and is provided with a cam follower portion 114 which cooperates with the periphery of cam 79, and a latch portion 115 which cooperates with the bail blade 109 to hold the portion 102 in contact locking position. Member 112 is normally biased counterclockwise by a spring 117.

Also mounted pivotally on the pivot rod 113 is a blocking member 116 which is provided with a blocking portion 118 which cooperates with the bail blade 109, and a cam follower portion 119 which cooperates with the periphery of the cam 81. A spring 121 normally biases the member 116 in a counterclockwise direction. Portions 101 and 102 acting as a unit are normally urged counterclockwise by a spring 122. Member 116 is also provided with a laterally extending projection 123 which cooperates with a latch element 124 carried pivotally on the pivot rod 113. Latch 124 is normally biased counterclockwise into engagement with the projection 123 by a spring 125.

Latch member 124 is provided with a depending portion 126 which cooperates with a cam follower member 127 mounted pivotally on a pivot shaft 128. Member 127 cooperates with the periphery of cam 82 and is provided with a tail portion 129 which cooperates with an extension 131 of a selector cam sensing member 132. To provide adjustment between the cooperating extensions 129 and 131 an adjusting screw 133 is carried on the extension 129. The member 132 is pivotally mounted on a pivot shaft 134 and is provided with a vertical arm 135 which cooperates with the fourth selector cam 136 of the selecting cam barrel 137, which is comparable to the cam barrel 28 disclosed in the aforementioned copending application Serial No. 739,747. As described in said application the cam barrel 137 derives its power from the main drive shaft 54. A spring 142 biases the member 132 to maintain arm 135 in cooperative relation with the cam barrel 137.

Figure 3:
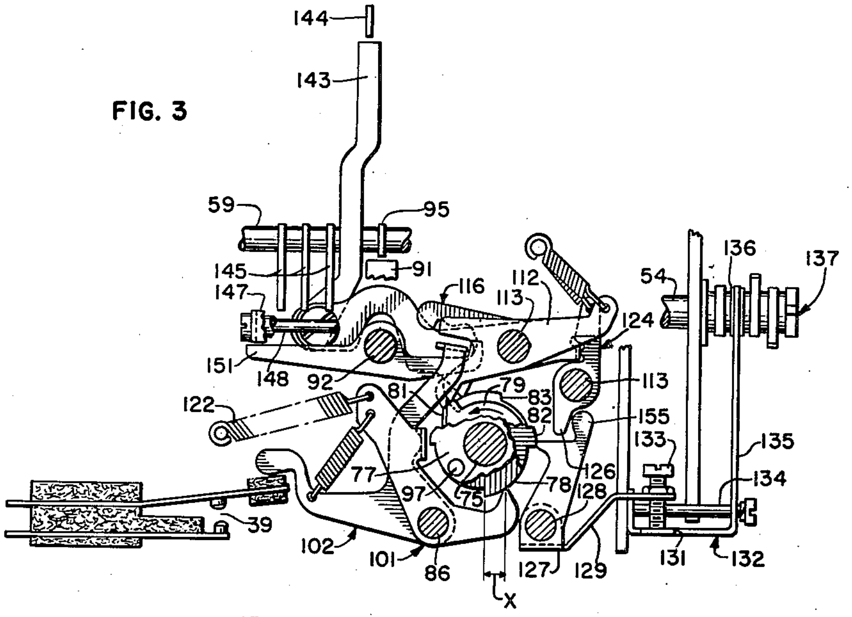
Fig. 3 is a cross-sectional view of the timing mechanism.

Also pivotally mounted on the pivot shaft 113 is a lever 138 which is normally biased counterclockwise by a spring 139 to maintain the cam follower projection 141 thereof in contactual engagement with the periphery of cam 83. Pivotally carried at the extremity of lever 138 is a vertically positioned bar 143 which functions under certain conditions of operation to block the selection of the "space" selector bar 144 (Fig. 3).

Certain of the operating levers 58 which have rearwardly extending arms 61 are provided with depending portions 145, which are adapted to cooperate with a bail rod 146 mounted in a bail member 147 mounted pivotally on a pivot rod 148. Bail member 147 is provided with an arm or extension 149 which cooperates with an arm 151 of a lever 152 pivoted on shaft 92. Arm 153 of lever 152 terminates in an upwardly directed portion adapted to cooperate with a stud 154 fixed to the latch member 112.

*General operation*

As previously mentioned, it is at times desirable, during normal transmission over a duplex line to ascertain which of said subscriber's stations wishes to transmit to the central station. As also mentioned, this selection of stations is under the control of the central station which periodically transmits over the duplex signal line a group of code signals identified as a transmitter start pattern, the significance of which is to initiate the operation of a remote subscriber transmitter if it is in readiness for message transmission. The transmitter start pattern according to the present invention comprises a "blank" code signal, followed by a measured pause, then a "space" code signal, then a transmitter start character (preferably any alphabet character), and finally a "letters" code signal. The measured pause is effected, by control means at the central station, by suppressing transmission of code signals for a predetermined period during which marking current is impressed on the line.

When the control unit 18 is utilized for station selection purposes, the sixth vane is activated or deactivated. When it is desired to select stations the sixth vane 42 (Fig. 4) of the control unit 18 at the subscriber's station is activated, that is, operated to its "station select" position. For example, this is accomplished by means of a "Figs. H" signal. However, the control unit is in a condition to receive the transmitter start pattern when it is in either the activate or deactivate position. Upon receipt of the "blank" signal, the "blank" selector bar (one of the bars 45) is selected to elevate the operating bar 58 associated herewith. This particular operating bar is provided with the tail portion 95 which, upon counterclockwise movement of bar 58 (as viewed in Fig. 4), acts to depress the bar 91 to cause the bail 85 to be rotated to disengage the arm 84 from the cam 77 thereby permitting the cam sleeve 76 to rotate through one cycle.

It is well known that when the "blank signal" is received (as with any code signal), the selector cam drum 137 is initiated into rotation in response to the start impulse, and makes a single rotation, stopping in response to the stop impulse. Therefore, if no signal is received after the "blank" signal, the cam drum 137 will come to rest with the cam projection on the No. 4 selector cam 136 in position to maintain, through bail member 132, the member 127 in the position shown in Fig. 3.

As the cam sleeve 76 rotates (at a predetermined rate), the cam follower arm 104 will not drop off the high part of cam 78 until the distance X has been traversed. This distance is proportional to or commensurate with the "measured pause" interval, during which no code signals are received. If no signals are received during the "measured pause" interval, the follower arm 104 will drop off of the high part of cam 78 so that spring 122 will rotate the contact control lever 101—102 to close the contacts 39 to establish a shunt across the printer selector magnet 28 to prevent operation of the printer 19. In the meantime, the cam follower 114 has dropped off of the high part of the cam 79 to permit the latching portion 115 of the latch lever 112 to fall in back of the bail portion 109 to hold the contacts 39 closed during the remainder of the cycle of rotation of sleeve 76. At a time substantially equivalent to the "measured pause" interval, the follower 141 of lever 138 will drop off of the high part of cam 83 to retract the bar 143 from blocking relation with the "space" selecting bar 144 thereby permitting the "space" bar 144 to be selected. The selection of the "space" bar 144 has been prepared for in advance by inserting a gate 72 in front of the blocking lever 67 associated with the "blank" code bar 58 as previously mentioned and as described in the aforementioned copending application Serial No. 739,747. Therefore, when the space bar 45 is thus unblocked by the bar 143, the shoulder 56 thereof engages its associated hook lever 57 to effect the raising of the operating bar 58 so that the cam portion 74 thereof engages the stud 71 of the adjacent blocking lever 67 to swing said lever 67 clockwise out of blocking relation with its associated selecting bar 45 which responds to the character code signal assigned to the transmitter 21 of the subscriber's station 13, 14, etc. from which it is desired to initiate transmission. As soon as the selecting bar 45 representative of the transmitter start character has been selected and its associated operating bar 58 has been operated the tail portion 145 of said operated bar 58 will actuate the trip bail 147 counterclockwise so that the arm 149 thereof will rock the lever 153 counterclockwise to engage the stud 154 to rock the lever 112 clockwise to unlatch the contact means 101—102 to open the contacts 39 to remove the shunt around the printer magnet 28. The operation of said operating bar 58 identified with the transmitter start character will substantially simultaneously with the opening of contacts 39, permit the contacts 36 (Fig. 4) to close to complete the aforedescribed energizing circuit for start magnet 34 of the selected transmitter distributor 21. Answer-back instrumentalities are thus provided by each distributor 21.

In the event that it is desired to control more than one transmitter 21 at a subscriber's station, more than one bar 145 is provided (in the present embodiment three such bars are provided). Thus, each bar 58 (having a tail portion 145) will, when selected, open a contact 36 associated with a transmitter 21.

If a code signal is received during the "measured pause" interval, the selector cam drum or assembly 137 will be initiated into rotation in response to the start impulse, and accordingly the cam projection on cam 136 will no longer hold the follower member 127 away from cam 82. Thus, as soon as the cam sleeve 76 starts to rotate in response to the transmitter start pattern, the cam follower 127 will ride off of the high point of cam 82 and rotate counterclockwise under the influence of spring 142, to cause its end portion 155 to cooperate with the depending portion 126 of latch 124 to effect the disengagement of latch 124 from lateral portion 123 of lever 116. When this occurs, the lever 116 will be actuated by its spring 121 to position its end 118 in the path of the bail portion 109 of the contact operating lever 102 to prevent the lever 102 from rotating counterclockwise under the influence of spring 122 when the arm 104 of bell crank 101 is free to drop off the high part of cam 78. Thus it is observed that if a signal is received during the "measured pause" interval, the contact 39 will not become closed and therefore the printer will not become shunted and message reception will not be interfered with.

Having thus described our invention, it is understood that minor changes may be resorted to in its construction without departing from the spirit and scope of the invention.

What is claimed is:

1. In a telegraphically controlled timing mechanism for controlling the operations of a telegraph receiver and a storage transmitter associated therewith, a first set of contacts for shunting said receiver, a second set of contacts for operating said transmitter, signal responsive means responsive to receive groups of code signals, said groups including a pause of predetermined duration interposed between predetermined conditioning codes, a cam means for controlling timing functions, said cam means initiated into operation in response to certain of said conditioning codes, a first means controlled by said cam means effective in response to said pause to control the operation of said first set of contacts, a second means controlled by said cam means effective under certain operating conditions to continue the closure of said first set of contacts, a third means controlled by said cam means effective under certain other operating conditions to prevent the operation of said first set of contacts, a fourth means controlled by said cam means effective in response to certain selective conditions of said signal responsive means to effectuate the operation of said third means, and a fifth means controlled by said cam means effective to condition the timing mechanism for operating said second set of contacts, whereby the operation of the storage transmitter is established by the operation of said second set of contacts and the recording apparatus is shunted by the operation of said first set of contacts in timed manner by said timing mechanism until transmission from the storage transmitter is established.

2. In a telegraphically controlled timing mechanism for controlling the operations of a telegraph receiver and a storage transmitter associated therewith, mechanical selecting means responsive to received groups of code signals, said groups including a pause of predetermined duration interposed between predetermined conditioning codes, a first set of contacts in said mechanical selection means for shunting said receiver, a second set of contacts in said mechanical selection means for operating said transmitter, means for conditioning said mechanical selection means for automatic response to the group of signals identified therewith, mechanical timing instrumentalities effective in response to said pause to operate said first set of contacts to shunt said receiver until transmission from the storage transmitter is established, and means in said mechanical selection means respective to said signals for establishing transmission from the selected storage transmitter.

3. In a telegraphically controlled timing mechanism for controlling the operations of a telegraph receiver associated therewith, mechanical selection means responsive to received groups of code signals, said groups including a pause of predetermined duration interposed between predetermined conditioning codes, contact means in said mechanical selection means for shunting said receiver, means for conditioning said mechanical selection means for automatic response to the group of signals identified therewith, mechanical timing instrumentalities effective in response to said pause to operate said contact means to shunt said receiver, and means operated by said mechanical timing instrumentalities under the control of said selection means in the absence of said predetermined pause to prevent the operation of said contact means, whereby the shunt for said receiver is rendered ineffectual.

4. In a telegraphically controlled timing mechanism for controlling the operations of a telegraph recorder and a storage transmitter associated therewith, a sequential control unit responsive to receive groups of code signals, said groups including a pause of predetermined duration interposed between predetermined conditioning codes, a timing means included in said control unit, and a pair of control contacts in said unit, one for establishing the operation of said storage transmitter and the other operated in timed manner by said timing means in response to said pause for shunting said recorder until transmission from said storage transmitter is established.

GEORGE G. KEYES.
GORDON SIM.

REFERENCES CITED

The following references are of record in the file of this patent:

UNITED STATES PATENTS

| Number | Name | Date |
|---|---|---|
| 1,577,634 | Detmers | Mar. 23, 1926 |
| 2,069,860 | Stewart | Feb. 9, 1937 |